United States Patent
Li

(10) Patent No.: US 11,808,860 B2
(45) Date of Patent: *Nov. 7, 2023

(54) ADAPTIVE SEARCH FOR LIDAR-BASED CLUSTERING

(71) Applicant: Aptiv Technologies (2) S.à r.l., Luxembourg (LU)

(72) Inventor: Meng-Hao Li, Los Angeles, CA (US)

(73) Assignee: Aptiv Technologies (2) S.à r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 17/859,598

(22) Filed: Jul. 7, 2022

(65) Prior Publication Data
US 2022/0366185 A1   Nov. 17, 2022

Related U.S. Application Data

(63) Continuation of application No. 16/742,961, filed on Jan. 15, 2020, now Pat. No. 11,403,482.

(51) Int. Cl.
| | |
|---|---|
| *G06K 9/62* | (2022.01) |
| *G01S 17/931* | (2020.01) |
| *G01S 17/42* | (2006.01) |
| *G01S 7/48* | (2006.01) |
| *G06F 18/2321* | (2023.01) |
| *G06V 10/762* | (2022.01) |

(Continued)

(52) U.S. Cl.
CPC .......... *G01S 17/931* (2020.01); *G01S 7/4802* (2013.01); *G01S 17/42* (2013.01); *G06F 18/2321* (2023.01); *G06V 10/763* (2022.01); *G06V 20/58* (2022.01); *G06V 20/64* (2022.01)

(58) Field of Classification Search
CPC ...... G06K 9/6226; G01S 7/4802; G01S 17/42
See application file for complete search history.

(56) References Cited

U.S. PATENT DOCUMENTS

| | | |
|---|---|---|
| 5,040,133 A | 8/1991 | Feintuch et al. |
| 8,171,025 B2 | 5/2012 | Tsai et al. |
| 8,195,662 B2 | 6/2012 | Tsai et al. |

(Continued)

FOREIGN PATENT DOCUMENTS

| | | |
|---|---|---|
| CN | 108256577 A | 7/2018 |
| DE | 102019210518 A1 * | 1/2021 |

(Continued)

OTHER PUBLICATIONS

C. Zhang, S. Wang, B. Yu, B. Li and H. Zhu, "A Two-Stage Adaptive Clustering Approach for 3D Point Clouds," 2019 4th Asia-Pacific Conference on Intelligent Robot Systems (ACIRS), 2019, pp. 11-16, doi: 10.1109/ACIRS.2019.8936035. (Year: 2019).*

(Continued)

*Primary Examiner* — Fayyaz Alam
(74) *Attorney, Agent, or Firm* — Billion & Armitage

(57) ABSTRACT

A method of clustering spatial data includes receiving a point cloud comprised of a plurality of points defined within three-dimensional (3D) space. The method further includes selecting one or more adaptable clustering parameters and traversing each of the plurality of points in the point cloud and selectively adding each of the points to one or more clusters based on the selected clustering parameters associated with each point.

20 Claims, 9 Drawing Sheets

(51) Int. Cl.
*G06V 20/58* (2022.01)
*G06V 20/64* (2022.01)

(56) References Cited

U.S. PATENT DOCUMENTS

| | | |
|---|---|---|
| 8,429,166 B2 | 4/2013 | Tsai et al. |
| 8,666,986 B2 | 3/2014 | Tsai et al. |
| 9,058,540 B2 | 6/2015 | Wu et al. |
| 9,710,493 B2 | 7/2017 | Wang et al. |
| 10,031,231 B2 | 7/2018 | Zermas et al. |
| 2012/0296905 A1 | 11/2012 | Tsai et al. |
| 2017/0132307 A1 | 5/2017 | Xiao et al. |
| 2018/0128905 A1 | 5/2018 | Cheong et al. |
| 2019/0049560 A1* | 2/2019 | Chattopadhyay ...... G06N 20/00 |
| 2019/0051006 A1* | 2/2019 | Chattopadhyay ..... G01S 7/4802 |
| 2020/0184278 A1* | 6/2020 | Zadeh ................. G06K 9/6264 |

FOREIGN PATENT DOCUMENTS

| | | |
|---|---|---|
| DE | 102019210518 A1 | 1/2021 |
| WO | 2019236588 A1 | 12/2019 |
| WO | WO-2019236588 A1 * 12/2019 ........... G01C 21/206 |

OTHER PUBLICATIONS

Ester, et al., "A density-based algorithm for discovering clusters in large spatial databases with noise", KDD-96, 1996, 226-231.
Ram, et al., "An enhanced density based spatial clustering of applications with noise.", In 2009 IEEE International Advance Computing Conference (pp. 1475-1478)., 2009.
Soni, "Aged (automatic generation of eps for dbscan).", International Journal of Computer Science and Information Security, 14(5), 536., 2016.
Zhang, et al., "A Two-Stage Adaptive Clustering Approach for 3D Point Clouds", Asia-Pacific Conference on Intelligent Robot Systems, 2019, 11-16 pages.

* cited by examiner

ADAPTIVE SEARCH FOR LIDAR-BASED CLUSTERING

CROSS-REFERENCE TO RELATED APPLICATION(S)

This application is a continuation application of U.S. patent application Ser. No. 16/742,961, filed Jan. 15, 2020, the entire disclosure of each of which is hereby incorporated by reference.

FIELD

This disclosure is generally directed to processing imaging data provided by LiDAR based systems and, more specifically to an adaptive density-based system and method of searching and clustering points to detect objects.

BACKGROUND

Autonomous vehicles require the ability to "see" various types of objects encountered by a vehicle, including other vehicles, pedestrians, buildings, gates, as well as a number of other objects encountered by autonomous vehicles. Non-autonomous vehicles similarly benefit form the ability to detect objects. To this end, it is common for vehicles to utilize one or more types of sensors to collect information that is analyzed to identify various objects. In particular, light detection and ranging (LiDAR) sensors operate by illuminating a target with laser light and measuring the reflected light with a sensor to determine a range to the object that caused the reflection. The output provided by a LiDAR system is a plurality of points referred to as a point cloud that represents a 3D shape or feature. Machine learning techniques such as clustering are utilized to organize the individual points into a collection of clusters that can ultimately be utilized to detect and/or identify objects.

A variety of different clustering techniques may be utilized, including (1) partitioning, (2) hierarchical, (3) density based and (4) grid based. For example, a commonly utilized clustering technique is the Density-Based Spatial Clustering of Applications with Noise (DBSCAN), which clusters together points that are closely packed together and marks as outliers or noise those located in low-density regions. A benefit of DBSCAN is that it does not require prior knowledge of the number of clusters to be formed, which allows DBSCAN to detect clusters with arbitrary shapes. However, when utilized in LiDAR applications DBSCAN has several drawbacks, including the inability to detect objects located both near and far from the sensor, inability to cluster objects having different density levels (e.g., shrubs versus vehicle), and inability to utilize properties of LiDAR sensor data.

It would therefore be beneficial to develop a clustering technique that overcomes one or more of the drawbacks associated with traditional clustering algorithms.

SUMMARY

According to one aspect, a method of clustering spatial data includes receiving a point cloud comprised of a plurality of points defined within three-dimensional (3D) space. The method further includes selecting one or more adaptable clustering parameters for each of the plurality of points. The method further includes traversing each of the plurality of points in the point cloud and selectively adding each of the points to one or more clusters based on the selected clustering parameters associated with each point.

According to another aspect, a method of clustering spatial data includes receiving a point cloud comprised of a plurality of points defined within three-dimensional (3D) space. A previously unclustered point is selected from the point cloud and a new cluster is created if the selected point was previously unclustered and is determined to be a core point based on a number of neighboring points located within a search radius. If determined to be a core point, neighboring points of the identified core point are added to a neighbor list. For each point on the neighbor list, a determination is made if the neighboring point is also a core point. For a neighboring point identified as a core point, the point is added to the cluster and neighbors of the neighboring point (i.e., core point) are added to the neighbor list for analysis. For a neighboring point not identified as a core point, the azimuth and/or elevation angle between the neighboring point and an adjacent point are compared to a threshold, wherein if the azimuth or elevation angle between the neighboring point and the adjacent point is less than a threshold the adjacent point is added to the neighbor list if not previously assigned to a cluster.

According to another aspect, a system includes at least one processor and a clustering module configured to, when executed by the at least one processor, implement a density-based clustering algorithm that clusters a plurality of points received by the system into one or more clusters. The density-based clustering algorithm is configured to receive a point cloud comprised of a plurality of points defined within three-dimensional (3D) space and apply a search algorithm to the point cloud, wherein the search algorithm selects clustering parameters including one or more of minimum point threshold and search radius for each point in the point cloud. The density-based clustering algorithm is further configured to apply a clustering algorithm to the point cloud, wherein the clustering algorithm traverses at least some of the points in the point cloud and utilizes the minimum point threshold and search radius associated with each point by the search algorithm to selectively add points to clusters.

DETAILED DESCRIPTION

To make use of spatial data such as point clouds, clustering algorithms are utilized to group points located close to one another. The resultant clusters are provided to object recognition/detection algorithms to classify objects. Density-based clustering algorithms operate by classifying each point in the point cloud as a core point, border point, or noise point. Core points are defined as those points having a minimum threshold (referred to as a minimum point threshold) of neighbors within a defined search radius ε. Border points are those points located within the neighborhood of a core point that do not have the minimum threshold of neighbors within a defined radius ε. Noise points are those points that are not core points or border points. Clusters are created by connecting neighboring core points and adding them to the same cluster. The adaptive clustering algorithm disclosed herein allows for one or more of the parameters to be modified. For example, the minimum point threshold utilized to determine if a point is a core point may be adjusted based on the distance the point is located from the sensor. This allows objects located further from the LiDAR sensor to be clustered despite a lower density of points associated with more distant objects. In addition, in some embodiments the adaptive clustering algorithm disclosed herein allows for the search radius ε to be modified. Increasing the search radius increases the number of neighboring points and therefore helps to cluster points in lower density areas. Finally, in some embodiments the adaptive clustering algorithm disclosed herein accounts for the effect the incident angle has on the distance between adjacent points, which sometimes leads to the failure of typical density algorithms to connect adjacent points within the same object. In some embodiments, the adaptive clustering algorithm utilizes the difference between the azimuth angles and/or elevation angles of adjacent points to determine whether neighbors of a border point (adjacent to a core point) should be added to the cluster. Utilizing one or more of these techniques alone or in combination with one another provides a more robust density-based clustering algorithm, capable of accurately clustering spatial data points.

Figure 1A:
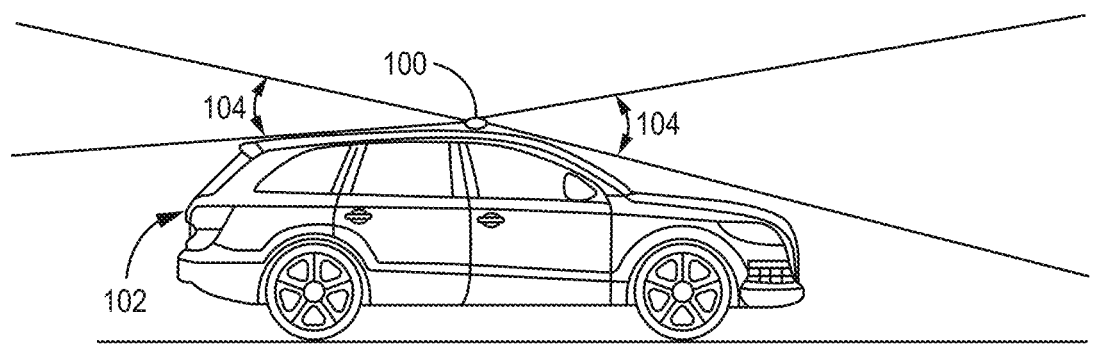
FIG. 1a is a side view of a vehicle comprising a Light Detection and Ranging (LiDAR) based imaging system according to some embodiments.
Figure 1B:
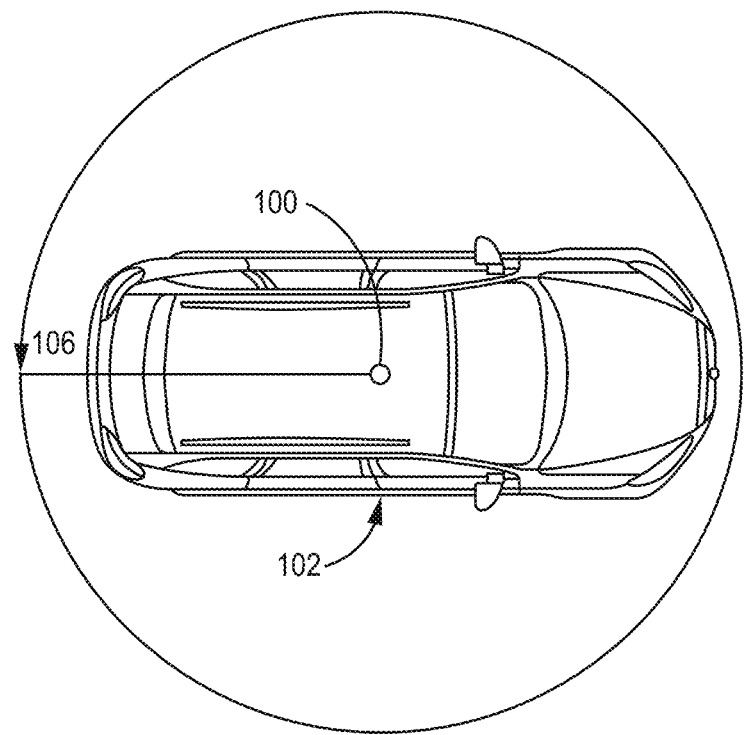
FIG. 1b is a top view of a vehicle comprising a LiDAR-based imaging system according to some embodiments.

FIG. 1a is a side view of a vehicle comprising a Light Detection and Ranging (LiDAR) sensor 100 according to some embodiments. In the embodiment shown in FIG. 1a, LiDAR sensor 100 is installed on a top portion of the vehicle 102. The LiDAR sensor 100 operates by emitting light (e.g., laser) pulses within a field of view of the vehicle. The field of view may include an elevation field of view 104 as shown in FIG. 1a (i.e., in the z-direction) as well as an azimuth field of view 106 as shown in FIG. 1b (i.e., in the x-y plane). In some embodiments, the elevation field of view is less than 180°, in some embodiments is less than 90°, and in some embodiments is less than 45°. In the embodiments shown in FIGS. 1a and 1b, the azimuth field of view is approximately 360°. In some embodiments though, the azimuth field of view is approximately 180°. In other embodiments, the LiDAR sensor 100 may be installed on the front, rear, or side of vehicle 102, and the field of view may be modified based on the installation site.

The LiDAR sensor 100 utilizes a light source (e.g., laser) and a detector. The light source generates a pulse of light and the detector monitors for reflections, wherein the time of flight associated with a reflection is utilized to estimate the distance/position of the object that caused the reflection. The set of spatial data generated as a result is comprised of a plurality of points located in space. As discussed in more detail below, the spatial data is clustered and the clustered data is utilized to detect/recognize objects. In response to detected objects, the vehicle 102 may take a number of actions, ranging from generating alerts for an operator of the vehicle to generating commands to alter the operation of the vehicle (e.g., autonomous actions for self-driving vehicles).

Figure 2A:
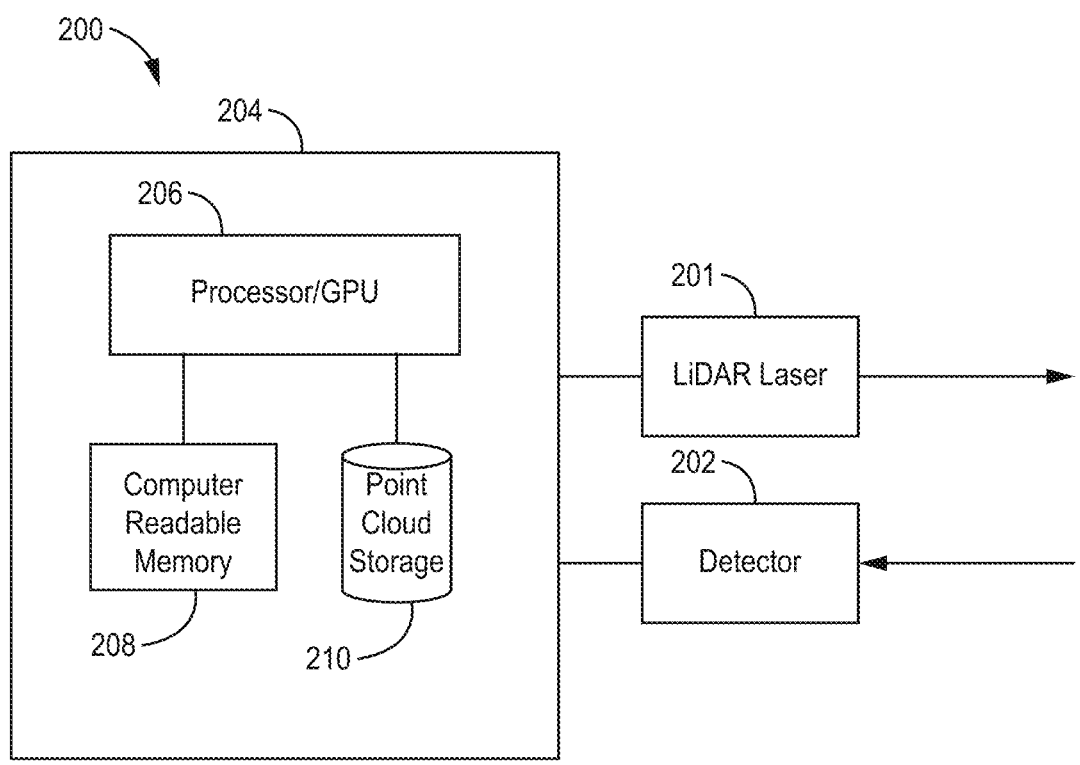
FIG. 2a is a block diagram of a LiDAR-based imaging system according to some embodiments.
Figure 2B:
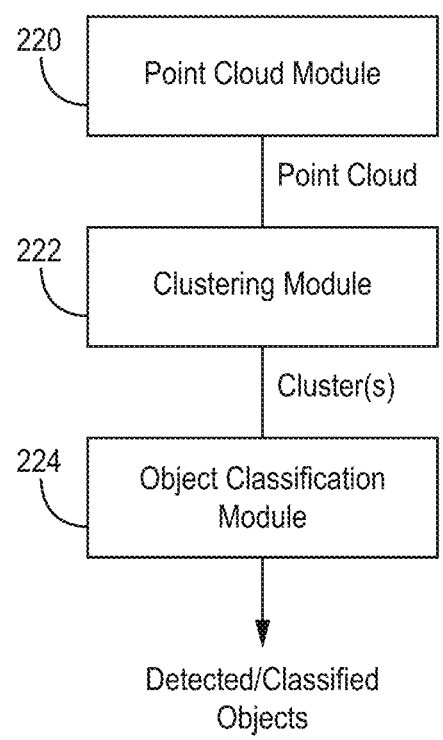
FIG. 2b is a block diagram of components utilized by the LiDAR-based imaging system to search and cluster the plurality of points according to some embodiments.

Referring to FIGS. 2a and 2b, components of a LiDAR-based imaging system 200 are shown in additional detail. In the block diagram shown in FIG. 2a, LiDAR-based imaging system 200 includes a LiDAR laser 201, detector 202, and processing system 204, which includes processor (e.g., central processing unit (CPU)/graphical processing unit (GPU)) 206, computer readable medium 208, and point cloud storage medium 210.

LiDAR light source 201 generates the pulse of light utilized to measure distance to objects. In some embodiments, LiDAR light source 201 may generate a single pulse of light (provided in a plurality of directions at the same time) or a plurality of individual pulses provided in specific directions at discrete points in time. The generated pulse of light travels away from the vehicle and interacts with objects located in the light path. Light reflected or backscattered from an object returns to the vehicle and is detected by detector 202. The time of flight of the light pulse provides information regarding the distance between the object and the detector 202. Each detected reflection provides spatial information regarding the surrounding environment, referred to herein as a point. In particular, processing system 204 receives information regarding the time of flight of detected light pulses and utilizes the information regarding the pulse to determine a location of the reflection. Processing system 204 aggregates a plurality of points to generate a point cloud that provides spatial information regarding the surrounding environment.

The LiDAR-based imaging system 200 may be implemented with a variety of different types of LiDAR systems, each of which operates on the point cloud comprised of a plurality of points. For example, flash LiDAR utilizes a single light source that illuminates the entire field of view in a single pulse. A focal plane of a flash LiDAR camera includes a plurality of rows and columns of detectors configured to record the time it takes the laser pulse to hit the target and return to the array to generate a 3D image of the surrounding area. In other embodiments, the LiDAR light source 201 may generate a plurality of individual pulses steered through the field of view, wherein the detector 202 measures the time of flight of reflected signals to determine the distance from the detector to the point of the reflection. Steering of the pulses may be provided via mechanical, electromechanical, or electrical means. For example, a microelectromechanical machine may be utilized to rotate a mirror, causing the laser to be steered through the field of view. In other embodiments, a phased array comprised of a plurality of antennas is utilized to generate a cohesive signal in a specific direction via control of the timing (phase) of each antenna in the phased array. Detected reflections—in particular information associated with detected reflections—are provided to processing system 204 for analysis.

In the embodiment shown in FIG. 2a, processing system 204 includes processor 206, computer readable medium 208 and point cloud storage 210. Computer readable medium stores instructions that when executed by the processor 206 causes the processor 206 to implement a variety of functions/operations on the data collected by the detector 202. For example, in some embodiments this includes a point cloud module 220, a clustering module 222, and an object classification module 224 (shown in FIG. 2b). In some embodiments, the point cloud module 220 is configured to generate the point cloud based on the reflections detected by the detector 202. Clustering module 222 analyzes the point cloud and groups the plurality of individual points into one or more unique clusters. The function performed by the clustering module 222 is described in more detail with respect to FIGS. 3, 4a and 4b below. Object classification module 224 detects objects within the field of view of the LiDAR-based imaging system 200 based on the received clusters. Detected objects—including information regarding the location of the object and/or distance to the object may be provided as an output to other systems.

Figure 3:
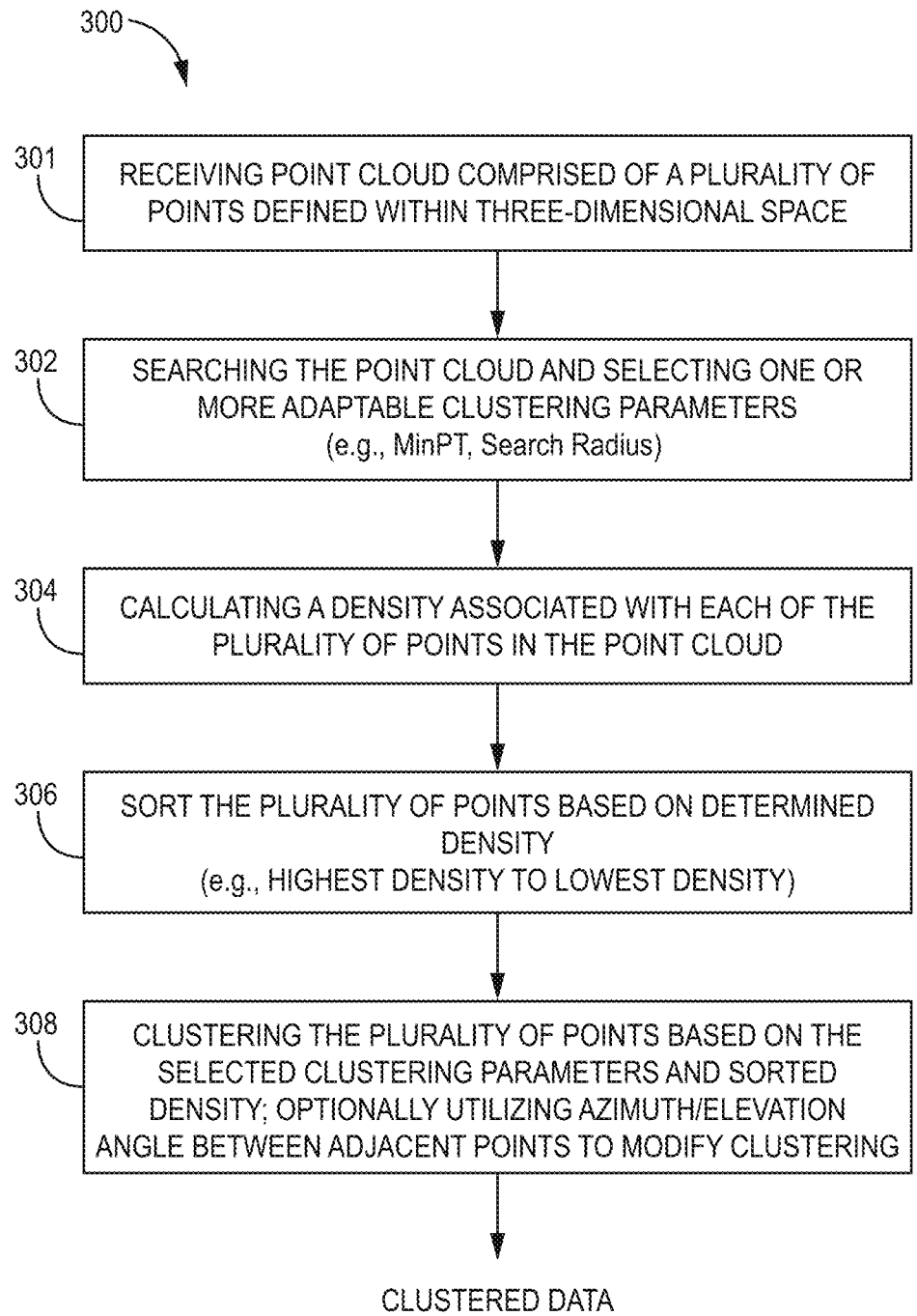
FIG. 3 is a flowchart illustrating steps utilized to implement the adaptive density-based clustering algorithm according to some embodiments.

FIG. 3 is a flowchart that illustrates the adaptive search/LiDAR-based clustering algorithm 300 according to some embodiments. The input to the adaptive search/LiDAR-based clustering algorithm 300 is the point cloud—comprised of a plurality of individual points—collected by the LiDAR laser 201 and detector 202 (shown in FIG. 2a). At step 301, the point cloud comprised of a plurality of points defined within three-dimensional space is received. At step 302 the point cloud is searched by visiting the plurality of points and selecting one or more adaptable clustering parameters (e.g., minimum point threshold MinPt and/or search radius ε) for each point.

In some embodiments, step 302 utilizes the distance of the point from the LiDAR sensor to modify one or more clustering parameters. For example, in some embodiments if the point being analyzed is determined to be located a short distance from the LiDAR sensor, then the clustering parameters are set to a first set of values in anticipation of points being relatively closely spaced. If the point being analyzed is determined to be located a greater distance from the LiDAR sensor, then the clustering parameters are set to a second set of values in anticipation of points being relatively further spaced apart. For example, the search radius ε may be increased for points located further from the LiDAR sensor. As described in more detail with respect to FIG. 4a, in some embodiments a minimum point threshold is utilized to determine if a point is a core point during the search at step 302, and the minimum point threshold may be modified based on distance of the point from the LiDAR sensor.

In some embodiments, step 302 modifies one or more adaptable clustering parameters in response to a first analysis providing insufficient density information (as described with respect to step 304). For example, if the number of neighbors located in a first search—based on a first search radius ε—is insufficient to make a meaningful density determination, then a second search may be performed of the point using a second, larger search radius ε. Based on the larger search radius additional neighboring points may be detected and utilized to determine density information associated with the point being analyzed. In some embodiments, the larger search radius ε is assigned to the point and utilized during subsequent clustering steps.

At step 304, a density is calculated with respect to each of the plurality of points. In some embodiments, the density level of the point is determined based on the number of points found with a search radius E of the point being analyzed. In some embodiments, the selection of one or more adaptable clustering parameters at step 302 is also utilized to provide more accurate density calculations. For example, in some embodiments the density of points around a point is based not only on the object reflecting the LiDAR laser but also on the distance of the object from the LiDAR sensor. For example, solid objects may provide a number of densely spaced points, but other objects (e.g., leaves) may result in more sparsely spaced points. In addition, because the space between adjacent LiDAR pulses increases further from the LiDAR sensor, the distance between adjacent points may also increase at greater distances. Modification of one or more clustering parameters at step 302 ensures that meaningful density information is obtained at step 304 for each point while maintaining good performance.

At step 306, the density determinations made at step 302 are utilized to sort the plurality of points. For example, in some embodiments the points are sorted from most dense to least dense. The output of step 306 is therefore an ordered (sorted) list of points, with each point including the parameters utilized during the search step (step 302) to analyze the point. This may include the search radius ε and minimum point threshold (MinPt) utilized to analyze the point.

At step 308, the plurality of points in the point cloud are traversed one at a time and placed into clusters based on the adaptable clustering parameters selected at step 302, which are utilized to assess the proximity of the points to one another. In some embodiments, the order in which points are traversed is based on the sorting of the points done at step 306. For example, in some embodiments the highest density point is analyzed first, wherein clustering includes reviewing the neighbors of the selected point and determining whether neighboring points should be added to the same cluster. This process continues until all points have been added to the one more created clusters or identified as noise points. As described in more detail below with respect to FIG. 4b, the clustering process includes classifying points as core points, border points, or noise points based on a determination of whether the point has a minimum number of points within a given search radius. As described with respect to step 302, in some embodiments the minimum point threshold utilized is modified based on the distance of the point from the LiDAR sensor. Different points may therefore utilize different parameters (e.g., MinPt, search radius) to determine whether a point should be added to a cluster. Hence, the order in which points are clustered will have an impact on the final cluster results. In contrast, if the same parameters were used for all points, there would be bi-directionality in determining whether a point is added to a particular cluster (that is, the order in which points were analyzed for clustering would have no impact on assigned clusters). Hence, in the embodiment shown in FIG. 3 the points are sorted based on determined density and utilized to determine the order in which points are clustered.

In addition, in some embodiments at step 308 the difference in azimuth/elevation angles between adjacent points—the azimuth/elevation angles being based on the angle between the LiDAR sensor and the point—is utilized to modify clustering. For example, a point determined based on the clustering algorithm to not be a core point, may nonetheless be identified as a core point for clustering purposes if the difference in azimuth/elevation angles between the point and an adjacent core point is less than a threshold—indicating that the points are neighbors and should be clustered together. This process is also described in more detail with respect to FIG. 4b and FIG. 6, below.

The output of the adaptive search/LiDAR-based clustering algorithm 300 is a plurality of clusters each assigned a plurality of points. As described above with respect to FIG. 2b, the plurality of clusters are provided to an object classification module to detect/classify objects.

Figure 4A:
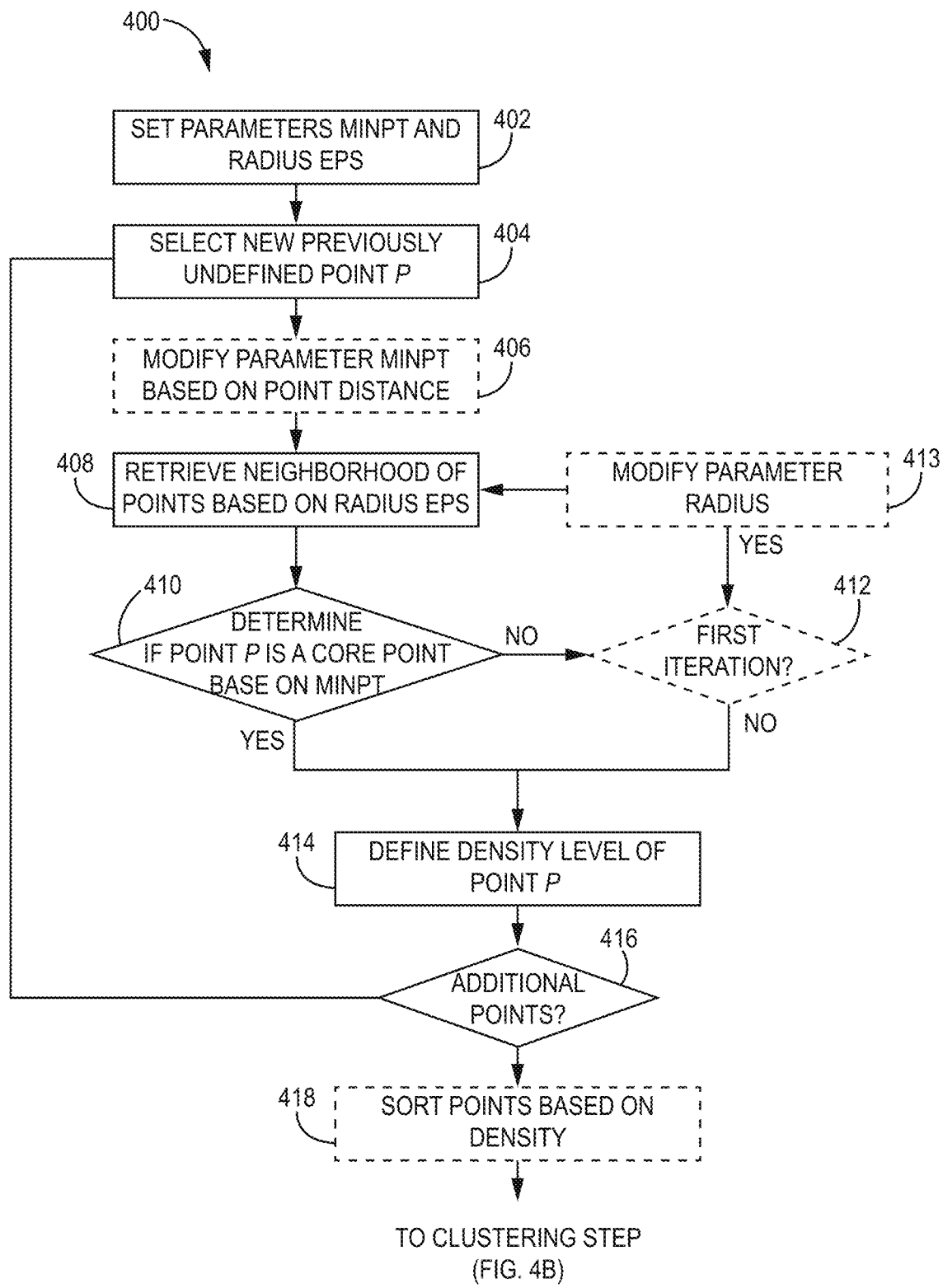
FIGS. 4a and 4b are flowcharts illustrating the steps utilized to search and cluster the plurality of points according to some embodiments.
Figure 4B:
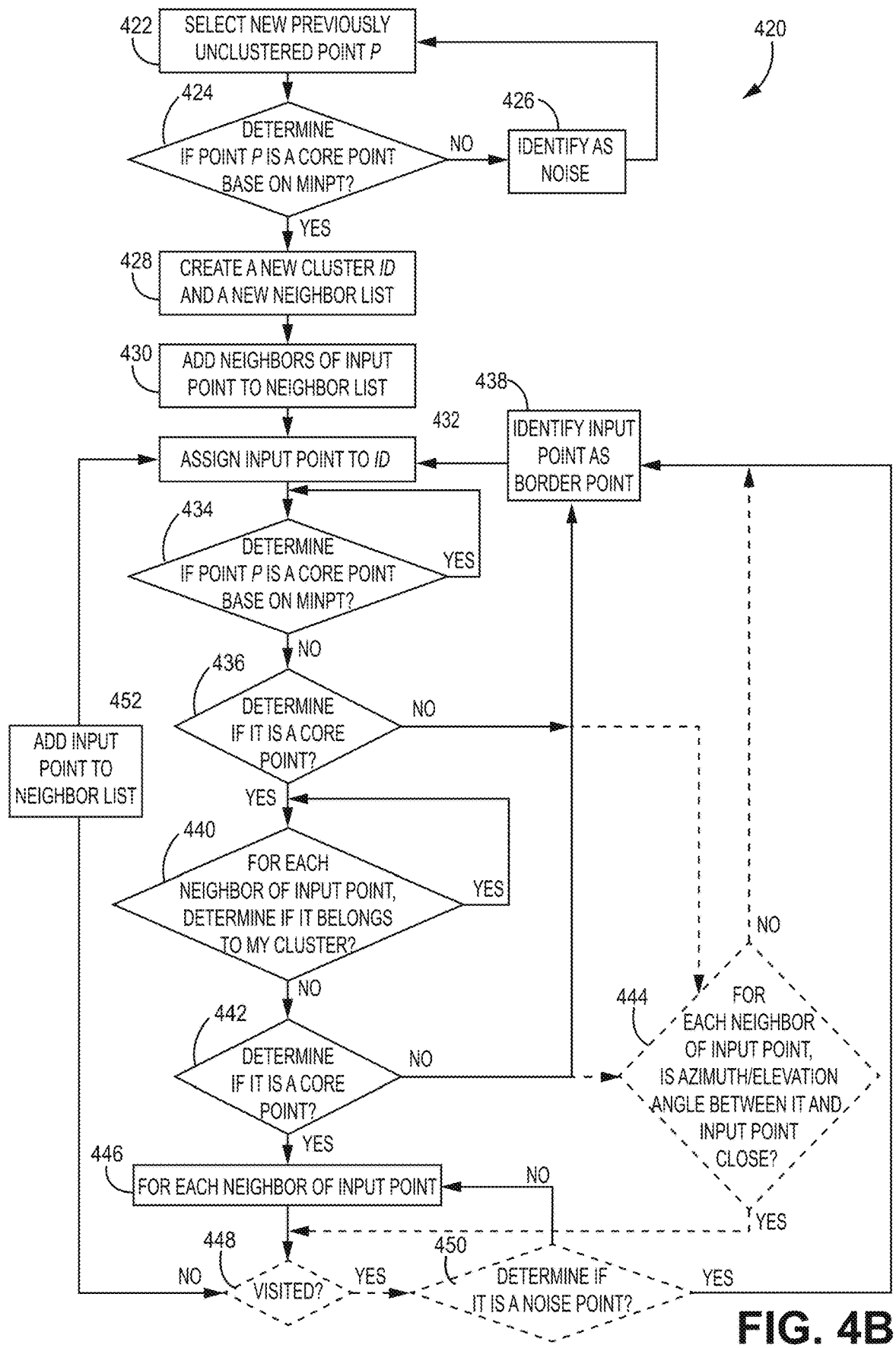

FIGS. 4a and 4b are flowcharts illustrating the adaptive search for LiDAR-based clustering algorithm 400 according to some embodiments. In particular, FIG. 4a illustrates a searching phase of the algorithm 400 and FIG. 4b illustrate a clustering phase of the algorithm 400. The input provided to the LiDAR-based clustering algorithm 400 is a point cloud comprised of a plurality of points. Each point is identified by a location in space relative to the LiDAR light source 201 and detector 202. As shown in FIGS. 4a and 4b, some of the steps in the flowchart are identified with dashed boxes, which indicates that the step may be optionally included as part of the adaptive search and clustering algorithm.

At step 402, one or more parameters are initialized, including for example a minimum point threshold minPt and search radius ε. In some embodiments, the initial parameters are predetermined and are always initialized to a particular value. In other embodiments, the parameters may be initialized upon some input. For example, external conditions (e.g., rain, snow, time of day, amount of light, etc.) may be utilized as input to determine the value of the one or more parameters. In some embodiments, initializing the search radius ε to a relatively small value more accurately represents the local density around the point being searched. In addition, a smaller search radius ε reduces the time required to complete the search, as fewer points need to be analyzed as potentially within the search radius ε.

At step 404, a previously undefined point is selected from the point cloud. In some embodiments, the order in which points are selected and analyzed is not important during the searching phase of the algorithm. Each point is analyzed during the searching phase and the order in which points are reviewed and analyzed does not affect the outcome of the searching phase.

In some embodiments, at step 406, the distance to the point being analyzed is utilized to selectively modify one or more parameters. In some embodiments, modified parameters include one or more of the minimum point threshold minPt and the search radius ε. The minimum point threshold minPt and search radius ε are utilized to determine whether a point should be classified as a core point, a neighbor point, or a noise point. The search radius ε determines the area searched for neighboring points. To be classified as a core point, the point being analyzed needs to have a number of neighbors located within the search radius ε greater than the minimum point threshold minPt. However, the distance to an object affects the resolution of the object. That is, as pulses of light extend from the LiDAR sensor the distance between each adjacent light pulse (each having a slightly different incident angle) increases with distance. As a result, reflections occurring further from the LiDAR sensor may be less densely spaced simply as a function of LiDAR resolution at that distance. In some embodiments, to mitigate the change in point density resulting from differences in distance to each point, the minimum point threshold minPt is modified based on the distance to the point being analyzed. In some embodiments, the minimum point threshold minPt is increased for points located close to the LiDAR sensor and decreased for points related further away from the LiDAR sensor. For example, in one embodiment, for each point $p_i$, located within a first (close) range the minimum point threshold is set to a first constant value $\text{minPt}_{close}$, for each point $p_i$ located within a second (far) range the minimum point threshold is set to a second constant value $\text{minPt}_{far}$, and for each point located between the first range and the second range the minimum point threshold is set to a value that varies based on distance to the point. This relationship may be expressed mathematically as follows:

$$\text{MinPts}_i = \qquad \text{Eq. (1)}$$

-continued
$$\begin{cases} \text{MinPts}_{close} & \text{if } dist(p_i, \text{sensor}) < \text{range}_{close} \\ \left[ \frac{\text{MinPts}_{close} - \text{MinPts}_{far}}{\text{range}_{far} - \text{range}_{close}} * (dist(p_i, \text{sensor}) - \text{range}_{close}) \right] \\ \text{MinPts}_{far} & \text{if } \text{distance}(p_i, \text{sensor}) > \text{range}_{far} \end{cases}$$

where $dist(p_i, \text{sensor})$ represents the distance to the point $p_i$, and $\text{range}_{close}$ represents a threshold minimum distance to the point, $\text{MinPt}_{close}$ is the minimum point threshold if the distance to the point is less than the distance $\text{range}_{close}$, $\text{range}_{far}$ represents a threshold maximum distance to the point, and $\text{MnPt}_{far}$ is the minimum point threshold if the distance to the point is greater than the distance $\text{range}_{far}$. In other embodiments, the minimum point threshold minPt varies continuously based on the distance to the point.

In some embodiments, either alone or in combination with modifications to the minimum threshold of points minPt, the search radius ε may be modified. In some embodiments, the search radius may be modified as described at step 413 to selectively enlarge the search radius ε if a first iteration does not return a sufficient number of points. In some embodiments, however, the search radius parameter ε may also be modified at step 406 based on one or more factors. For example, the initial search radius $\varepsilon_{1st,i}$ may be modified based, at least in part, on the distance of the point to the LiDAR sensor and/or based on the resolution of the LiDAR sensor. For example, the selection of the initial search radius parameter $\varepsilon_{1st,i}$ may be expressed mathematically as follows:

$$\varepsilon_{1st,i} = \begin{cases} \epsilon_{min} & \text{if } \epsilon_{min} > k_\epsilon * \text{range}(p_i) * \text{resolution} \\ k_\epsilon * \text{range}(p_i) * resol & \text{otherwise} \end{cases} \quad \text{Eq. (2)}$$

where $k_\varepsilon$ is the constant gain of searching and resol is the LiDAR resolution expressed in radians, $\text{range}(p_i)$ is the distance to the point being searched, and $\varepsilon_{1st,I}$ is the search radius utilized in the first iteration or first search radius. In this embodiment, a minimum search radius $\varepsilon_{min}$ is utilized if the term $k_\varepsilon * \text{range}(p_i) * resol$ is less than a minimum radius $\varepsilon_{min}$. As shown, the search radius $\varepsilon_{1st,i}$ is directly related to the distance of the point from the LiDAR sensor ($\text{range}(p_i)$) and to the resolution of the LiDAR system (resol). For example, as the distance of the point from the LiDAR sensor ($\text{range}(p_i)$) increases, the search radius $\varepsilon_{1st,i}$ increases. Likewise, as the resolution of the LiDAR sensor (resol) increases, the search radius $\varepsilon_{1st,i}$ increases. In this way, in some embodiments one or more parameters (e.g., minimum point threshold minPt, search radius ε) are modified at step 406 based on the distance of the point from the LiDAR sensor.

At step 408, the neighborhood of points within the radius ε (in the first iteration, search radius $\varepsilon_{1st,i}$) are collected. At step 410, a determination is made regarding whether the point is a core point based on a comparison of the number of points located within the radius ε to the selected minimum point threshold minPt. If the number of points located within the radius ε of the point is greater than the minimum point threshold minPt then the point is determined to be a core point and the process continues to step 414. If the number of points located within the radius ε of the point is less than the minimum point threshold, then in some embodiments the process determines at step 412 whether this is the first search (e.g., first iteration) or second search. In some embodiments, rather than just identify the point as a noise point and continue the search with the next point, at steps 412 and 413 the search radius ε may be modified (i.e., increased) and the point is searched again for neighbors within the updated and larger search radius $\varepsilon_{2nd,i}$. In the embodiment shown in FIG. 4a, the radius parameter ε is only modified after the first iteration. That is, at step 412 a determination is made whether this is the first iteration of the search on the point $p_i$ or the second iteration of the search on the point $p_i$. If the search of the point $p_i$ is not determined to be a core point at step 410, and furthermore is the result of a second iteration of search of the point $p_i$, then no more additional searching with respect to point $p_i$ will be conducted and the process continues to step 414. Conversely, if the search of the point $p_i$ is not determined to be a core point at step 410, and furthermore is the result of a first iteration search of the point $p_i$, then at step 413 the search radius parameter ε is modified (i.e., increased) and a second review of the point $p_i$ is conducted based on the larger search radius (and presumably additional points retrieved based on the modified search radius).

In some embodiments, modifying/increasing the initial search radius $\varepsilon_{1st,i}$ after an initial determination that a point is not a core point (i.e., too few neighbors located within the search radius) allows the algorithm to gather useful density information with respect to low-density areas. This may include regions located further from the LiDAR sensor and/or associated with objects that do not provide a large number of reflected points or surfaces. Hence, if a minimum threshold of points sufficient to classify the point as a core point has already been collected, then there is no need to increase the search radius and collect additional information regarding the neighbors of the points. Likewise, if after increasing the search radius a subsequent search of the point does not return useful density information, the search radius $\varepsilon_{2nd,i}$ may not be increased again so as to prevent the search radius from becoming so large as to lose meaning with respect to neighboring points.

In some embodiments, the search radius $\varepsilon_{1st,i}$ is modified by a predetermined amount at step 413. In other embodiments, the initial search radius $\varepsilon_{1st,i}$ is modified based on the number of neighboring points located during the first iteration at step 413. For example, in some embodiments if no neighboring points were found with respect to the point being analyzed, then the search radius $\varepsilon_{1st,i}$ is increased to a maximum radius (e.g., $k_\varepsilon * \varepsilon_{1st,i}$). Otherwise, in some embodiments the search radius $\varepsilon_{1st,i}$ is increased by an amount related to the number of neighboring points located during the first iteration. For example, in some embodiments the increase in the search radius is defined by the following conditions:

$$\varepsilon_{2nd,i} = \begin{cases} \varepsilon_{1st,i} & \text{if } num_{\varepsilon-ngbh} > MinPts_i \rightarrow \text{Search is done} \\ k_\varepsilon * \varepsilon_{1st,i} & \text{if } num_{\varepsilon-ngbh} = 1 \\ \sqrt{\frac{MinPts_i}{num_{\varepsilon-ngbh}}} * \varepsilon_{1st,i} & \text{otherwise} \end{cases} \quad \text{Eq. 3}$$

where $\varepsilon_{2nd,i}$ is the search radius used in the second iteration for the point i, $num_{\varepsilon-ngbh}$ is the number of points found during the first search, and $\varepsilon_{1st,i}$ is the search radius used in the first iteration. In this embodiment, if only a single point, which is itself, is found (i.e., if $num_{\varepsilon-ngbh}=1$) then a maximum search radius is selected that is equal to $k_\varepsilon * \varepsilon_{1st,i}$, otherwise the search radius is set to a value related to the number of points detected $num_{\varepsilon-ngbh}$ using the first iteration search radius $\varepsilon_{1st,i}$. The greater the number of neighboring points detected using the first iteration search radius $\varepsilon_{1st,i}$, the smaller the increase in the second iteration search radius $\varepsilon_{2nd,i}$, as indicated by the equation $$\sqrt{\frac{MinPts_i}{num_{\varepsilon-ngbh}}} * \varepsilon_{1st,i}.$$

At step 408 the neighboring points are retrieved based on the modified search radius $\varepsilon_{2nd,i}$ and at step 410 the point is analyzed again to determine whether it should be considered a core point. In some embodiments, following the second iteration the process continues to step 414 regardless of whether the point is determined to be a core point or a noise point.

Figure 5:
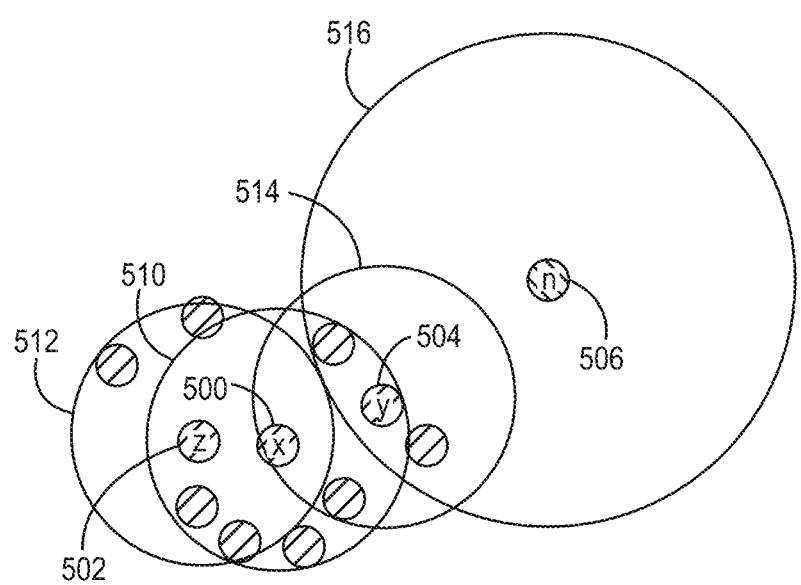
FIG. 5 is a diagram illustrating the effect variable search radii have on identification of neighboring points and clustering according to some embodiments.

At step 414, the density of the point $p_i$ is determined based on the search radius and the number of neighboring points located within the search radius. As discussed above, because the search radius may be modified during the search process, the density level is determined using the search radius utilized to return the neighboring points associated with point $p_i$. In some embodiments, the density is calculated by dividing the number of neighboring points by the square of the search radius (i.e., $\varepsilon^2$). In some embodiments, $\varepsilon^2$ is utilized rather than $\varepsilon^3$ because the surface that reflects the light does not permit light to be reflected from behind the surface. At step 416 a determination is made whether all points have been searched or whether additional points must be searched and classified. If additional points need to be searched and classified, then the process continues at step 404 with selection of a new, previously unclassified point. If no additional points need to be searched and classified, then the searching process is complete. In some embodiments, prior to initiating the clustering process (shown in FIG. 4b), at step 416 the plurality of points are sorted based on density. In some embodiments, because the radius utilized to search for neighbors of each point is variable, the order in which points are clustered matters. Reference is made to FIG. 5, which illustrates how the variable search radii introduced at steps 406 and/or 413 affect the clustering phase. In the example shown in FIG. 5, point 500 (labeled "x") is identified as a core point and all points located within search radius 510 are identified as neighboring points. Likewise, points 502 (labeled "z") and 504 (labeled "y") are identified as core points, and points located within search radius 512 and 514, respectively, are included as neighboring points. In this example, point 506 (labeled "n") is located outside of search radius 514 and is therefore not included as a neighbor of point 504. However, search of point 506 results in assignment of a search radius 516 that is larger than search radii 510, 512, and 514. As a result, point 504 is identified as a neighbor of point 506. This example illustrates how the modification of the search radius parameter ε means that the bi-directional relationship between points (e.g., classification of a second point as a neighbor of a first point means that the first point can also be classified as a neighbor of the second point) is no longer valid. As a result, the order in which points are clustered will determine whether points are included in a cluster or not. For example, clustering point 506 first in the embodiment shown in FIG. 5 would result in point 506 being assigned to a cluster that includes point 504. However, clustering point 504 first would result in point 504 being assigned to a cluster that includes points 500 and 502, but not point 506. In some embodiments, points in high density areas should be clustered prior to clustering points in low density areas. However, in other embodiments it may be desirable to cluster points in the opposite order—from low-density areas to high-density areas. As a result, in some embodiments it is important that the density of each point be known and sorted to allow points in higher density areas to be clustered first.

FIG. 4b illustrates clustering of the plurality of points according to some embodiments. In some embodiments, the input provided to the clustering step includes a plurality of points—ordered based on density—and assigned a minimum point threshold minPt and/or search radius ε as determined during the search phase. Reference is made throughout the description of the clustering step to FIG. 6, which illustrates at least a portion of the clustering step according to some embodiments.

At step 422, a new previously unclustered point P is selected. In addition, in some embodiments the sorting of points provided at step 418 (shown in FIG. 4a) is utilized to select the next point to be clustered, with the next point representing the highest density point that remains unclustered.

At step 424 a determination is made whether the selected point P is a core point based on the minimum point threshold minPt. That is, the number of neighbors associated with the point P is compared to the minimum point threshold minPt, wherein if the number of neighboring points is greater than a threshold value the point is identified as a core point and the process continues at step 428. In some embodiments, the parameters utilized to identify points as core points or noise point (e.g., minimum point threshold minPt, search radius ε) are provided by the searching phase for each point as described above with respect to FIG. 4a. That is, in some embodiments each point may utilize a different set of parameters (e.g., minimum point threshold minPt and/or search radius ε). If the number of neighboring points is less than the minimum point threshold minPt then the point is identified as noise at step 426 and the process continues at step 422 with the selection of a new previously unclustered point P.

Figure 6:
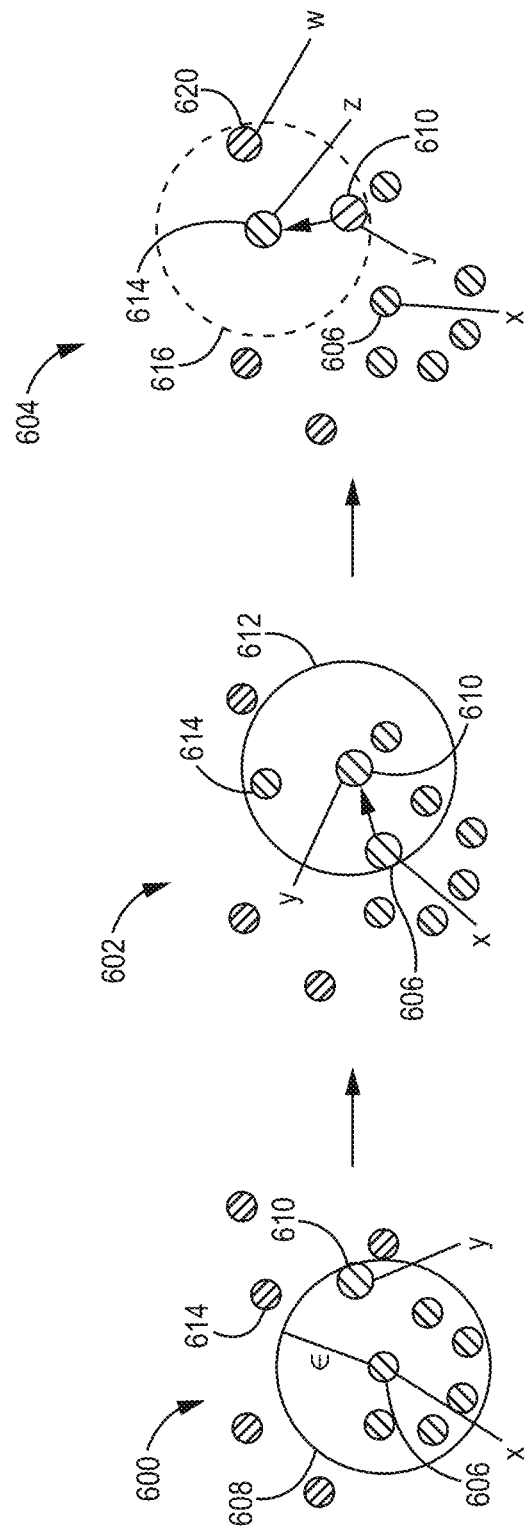
FIG. 6 is a diagram illustrating an example set of points clustered according to some embodiments.

At steps 428, based on the identification of a core point at step 424, a new cluster is created and assigned a cluster ID ID and a new neighbor list is created. At step 430, neighbors of the selected core point are added to the neighbors list. In some embodiments, neighbors include those points located within the search radius ε of the input point. At step 432, the selected core point is assigned to the cluster ID ID. Subsequent steps determine how many additional points should be added to cluster ID ID. With reference to FIG. 6, the clustering of a plurality of points is illustrated in steps 600, 602, and 604. Assuming point 606 (labeled 'X') is the point selected at step 422 and identified as a core point at step 424, then at step 430 all neighbors of point 606 (i.e., all points within the search radius 608) are added to the neighbor list, including point 610 (labeled 'Y').

At step 434, each point included in the neighboring list is reviewed to determine whether the point has already been assigned to another cluster. For those points already assigned to a cluster, they cannot be assigned to the current cluster ID ID. That is, the status of neighboring points already assigned to a cluster remains unchanged and no further action is taken with respect to the neighboring point already assigned to a cluster. If the neighboring point is not assigned to another cluster, then at step 436 a determination is made whether the neighboring point is a core point (e.g. if the number of neighboring points is greater than the minimum threshold value (minPt)). If the point is not a core point, then at step 438 the point is identified as a border point and at step 432 is assigned to the cluster ID ID. That is, points identified as border points are included within the cluster but—at least typically—are not further analyzed to identify neighboring points. In some embodiments, however, points identified as border points at step 436 (i.e., not core points) are further analyzed to determine if any points adjacent to the border point are separated from one another by a relatively small (i.e., less than a threshold) azimuth/elevation angle relative to the LiDAR sensor. For points that satisfy the azimuth/elevation angle test, the points are reviewed at steps 448 and 450 (described in more detail below) to determine how they should be classified. The process then continues at step 434 with the selection of another neighbor point from the neighbor list to analyze. With reference to step 602 in the example shown in FIG. 6, neighboring point 610 ("Y") is identified as a core point because it includes a number of neighbors within the search radius ε greater than or equal to the minimum point threshold MinPt (e.g., four, in this example).

If at step 436 the neighbor point is determined to be a core point then each neighbor of the identified core point is analyzed. A neighbor point determined to be a core point will be assigned to the cluster ID ID at step 432, and neighboring points of the core point will be added to the neighbor list (not specifically shown as a step, but neighboring points of the identified core point are analyzed). For the sake of clarify, the neighbor point identified at step 436 as being a core point is referred to herein as an input point because this point acts as an input for analysis performed at steps 440-446. At step 440 for each neighbor point of the input point a determination is made whether the neighbor point already belongs to another cluster. If the neighbor point already belongs to another cluster, the neighbor point cannot be added to the current cluster ID ID and the process continues with the next neighbor point at step 440. If at step 440 it is determined the neighbor point does not belong to another cluster, then at step 442 a determination is made whether the neighbor point is a core point. If the neighbor point is not a core point, then in some embodiments the point is identified as a border point at step 438 and added to the cluster ID ID at step 432, but none of the neighbors of the point are added to the cluster or analyzed further. With reference to step 604 in FIG. 6, because point 610 ("Y") is determined to be a core point, the neighbors of input point 610—including point 614 (labeled "Z") are analyzed in turn at steps 440 and 442. In the example shown in FIG. 6, point 614 ("Z") does not belong to another cluster. At step 442 it is determined that neighbor point 614 is not a core point because it does not include enough neighboring points within the search radius 616 of the point 614. In some embodiments, neighbor point 614 would be identified as a border point at step 438 and would be added to the cluster at step 432—but would not result in any of the neighbors of the border point being added to the cluster. For example, neighbor point 620 (labeled "W") would not be added to the neighbors list and therefore would not be added to the current cluster.

If at step 442 the neighbor point is determined to be a core point, then at step 446 each neighbor of the core point identified at step 442 is reviewed. Again, for the sake of clarity the neighbor point identified as a core point at step 442 is referred to as an input point to step 448. At step 448 each neighboring point of the input point is reviewed to determine whether it has been previously visited. If the neighboring point has been previously visited, then at step 450 a determination is made whether the neighboring point was previously determined to be a noise point. If the neighboring point was previously determined to be a noise point, then at step 438 this designation is changed to border point and at step 432 the neighboring point is added to the cluster ID ID. If the neighboring point was previously visited but was not previously determined to be a noise point, then this means the point was previously added to another cluster and no further action should be taken with respect to this point. In this case, the process continues at step 446 with the next neighbor in the for-loop at step 446. If the neighboring point has not been previously visited as determined at step 448, then at step 452 the point is added to the neighbor list and at step 432 the input point (identified as a core point at step 436 and/or step 442) is assigned to the cluster ID ID. This process continues until all neighbor points in the neighbor list have been analyzed.

Figure 7:
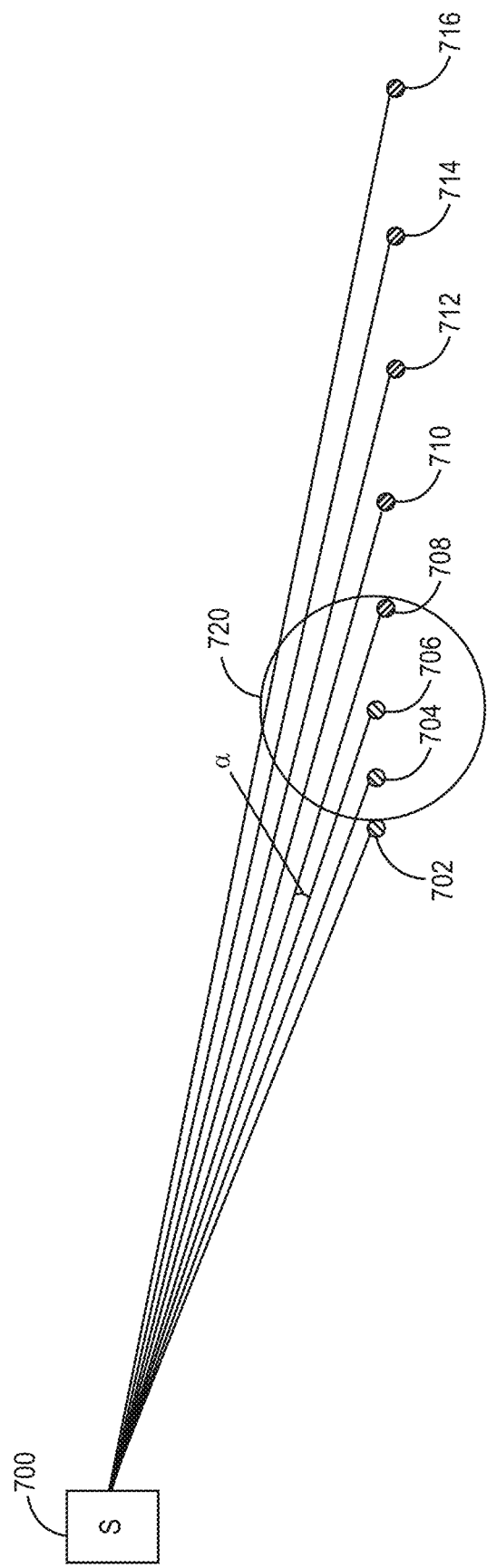
FIG. 7 is a diagram illustrating the effect incident angle and resolution has on the distance between adjacent points according to some embodiments.

However, as discussed above with respect to step 436 above, in some embodiments a determination that a neighbor point is not a core point (and therefore is a border point) may further include a review of azimuth/elevation angles between the border point (referred to herein as the input point) and neighboring points of the border point (referred to as adjacent points to differentiate from the term neighboring point). At step 444, the azimuth and/or elevation angles associated with the border point (e.g., input point) is compared to the azimuth and/or elevation angles of neighboring points (i.e., adjacent points) points at step 444. The problem being solved via the addition of step 444 is illustrated in FIG. 7, in which a plurality of points 702, 704, and 706 have been added to a cluster, but point 706 is identified as a border point. Typically, this would mean that point 708 would not be added to the same cluster. However, in this example the distance between points 706 and 708 is a result of the distance of point 708 from the LiDAR sensor 700 as well as the angle (azimuth angle) the LiDAR beam makes with the point. In the example shown in FIG. 7 the points 700-716 are all associated with a semi-truck located on the side of the vehicle, although the distance between adjacent points increases as the points move farther away from the LiDAR sensor and at a different azimuth angle. This is remedied by reviewing the difference in azimuth/elevation angles between point 706 identified as a not a core point (i.e., border point) and adjacent point 708. If the difference in azimuth/elevation angles is less than a threshold, then the adjacent point 708 may be added to the neighbor list (and therefore to the cluster).

In the embodiment shown in FIG. 4b, at step 444 if the difference in azimuth/elevation angles is not less than a threshold, this indicates that the points are not adjacent to one another in terms of LiDAR pulses. In this case, the process continues at 438, wherein the neighbor point identified at step 442 as not being a core point is identified as a border point and added to the cluster ID at step 432. In contrast, if the difference in azimuth/elevation angles is less than a threshold this indicates that the points are likely adjacent to one another and at step 448 a determination is made whether the point has been previously visited for clustering purposes. If at step 448 it is determined that the point has been previously visited, then at step 450 a determination is made whether the point was previously identified as a noise point. If the point is identified as a noise point, then the point is instead identified as a border point at step 438 and assigned to the cluster ID ID at step 432. Conversely, if the point is not identified as noise at step 450, then this means the point was previously added to another cluster and no further action should be taken with respect to this point. In this case, the process continues at step 446 with the next neighbor in the for-loop. If at step 448 it is determined that the point has not been visited, then at step 452 the point (i.e., adjacent point) is added to the neighbor list and assigned to the cluster ID ID at step 432.

With reference to FIG. 6, point 614 (labeled "Z") is the neighbor point analyzed at step 442. In this example, neighbor point 614 is not a core point, so in some embodiments at step 438 the neighbor point 614 would be identified as a border point. However, in some embodiments, the neighboring point 614 is provided as an input to the azimuth/elevation analysis at step 444 to determine whether points adjacent to neighboring point 614 should be added to the neighbor list. At step 444, neighboring point 614 becomes the input point and the neighbors of point 614 (i.e., adjacent points) are analyzed to determine if the difference in elevation/azimuth angles between the input point 614 and adjacent points (e.g., point 620, labeled "W") is less than a threshold. If no, then the adjacent point (e.g., point 620, "W") is not identified as either a border point or included as part of the cluster. As a result, the process continues to step 438 with the input point 614 being identified as a border point (as a result of the determination made at step 442) as expected. If yes, then at step 448 a determination is made whether the adjacent point (e.g., point 620, "W") has been visited before. If adjacent point 620 ("W") has been visited before, then at step 450 it is determined whether the point is a noise point or not. If adjacent point 620 ("W") is a noise point, then at step 438 the point is identified as a border point and added to the cluster ID ID at step 432. If adjacent point 620 ("W") is not a noise point (and therefore previously clustered) then no additional steps are taken. Because there are no other neighboring point of point 614, the process continues at step 434 with the next neighbor in the neighbor list. If the adjacent point 620 (e.g., "W") has not been visited, then the point 620 is added to the neighbor list at step 438 and assigned to the cluster ID ID at step 432. In this way, adjacent point 620 is added to the cluster despite the identification of point 614 as a border point, which would typically exclude the addition of adjacent point 620 to the same cluster.

In this way, the adaptive search for LiDAR-based clustering described with respect to FIGS. 4a and 4b provides as an output one or more clusters, each cluster assigned one or more points. As described previously with respect to FIG. 2b, the clusters are provided as an input to the object classification module, which utilizes the clusters to identify objects within the field of view of the LiDAR sensor. As described above, in some embodiments the adaptive search for LiDAR-based clustering allows for the modification of clustering parameters, including one or more of minimum point thresholds (utilized to classify points as core points) and search radius. In particular, allowing for the search radius to be modified aids in identifying objects having different densities or areas of different densities (for example, a bush having leaves may have a different density of points then a car). In addition, the modification of the clustering parameters allows the clustering algorithm to account for the object being located various distances from the LiDAR sensor. That is, the farther an object is located from the LiDAR sensor, the larger the distance between two adjacent points and fewer total points on the object. Modifying the parameters such as minimum point threshold and search radius allows the clustering algorithm to cluster points associated with both far away objects and close objects. In some embodiments, the adaptive search for LiDAR-based clustering also allows for the connection of densely clustered points with sparsely clustered points. In particular, the different in azimuth and/or elevation angles are reviewed to determine whether a connection should be made between a border point and a core point. In this way, the adaptive search for LiDAR-based clustering is able to cluster different types of objects, located at different distances and angles relative to the LiDAR sensor.

Discussion of Possible Embodiments

The following are non-exclusive descriptions of possible embodiments of the present invention.

According to one aspect, a method of clustering spatial data includes receiving a point cloud comprised of a plurality of points defined within three-dimensional (3D) space. The method further includes selecting one or more adaptable clustering parameters and traversing each of the plurality of points in the point cloud and selectively adding each of the points to one or more clusters based on the selected clustering parameters associated with each point.

The method of the preceding paragraph can optionally include, additionally and/or alternatively any, one or more of the following features, configurations and/or additional components.

For example, selecting one or more clustering parameters may include selecting a minimum point threshold parameter and/or a search radius parameter.

In some embodiments, the minimum point threshold parameter and/or search radius parameter is selected based on a distance to the point.

In some embodiments, the minimum point threshold parameter is decreased as the determined distance to the point increases.

In some embodiments, the search radius is increased as the determined distance to the point increases.

In some embodiments, the method further includes calculating a density associated with each of the plurality of points based on a number of neighboring points located within a search radius of the point.

In some embodiments, calculating the density associated with each of the plurality of points includes identifying the point as a core point based on a comparison of a number of neighboring points located within a search radius of the point with the defined minimum point threshold and increasing the search radius if the point is not identified as a core point and retrieving additional neighboring points based on the increased search radius, wherein calculating the density of the point is based on the increased search radius and additional neighboring points.

In some embodiments, the plurality of points are sorted based on the calculated density of each point.

In some embodiments, each of the plurality of points in the point cloud is traversed based on the sorted density of the plurality of points, wherein points are traversed from dense to sparse.

In some embodiments, traversing each of the plurality of points in the point cloud and selectively adding each of the points to one or more clusters includes selecting a previously unclustered point and creating a new cluster if the selected point is a core point and previously unclustered. Neighboring points are added to a neighbor list associated with the new cluster if the point is a core point, wherein neighboring points are located within a search radius of the core point. Each point on the neighbor list is reviewed and identified as either as a core point or a border point, wherein a neighbor point identified as a core point is assigned to the new cluster and neighbors of the neighbor point identified as a core point are added to the neighbor list, wherein a neighbor point identified as a border point is assigned to the new cluster but neighbors of the border point are not added to the neighbor list.

In some embodiments, in response to identification of a point as a border point, incident angles between the border point and points adjacent to the border point are compared to a threshold, wherein if the difference is less than the threshold the adjacent point is added to the neighbor list associated with the new cluster if not previously assigned to a cluster.

In some embodiments, the incident angles are azimuth angles and/or elevation angles.

According to another aspect, a method of clustering spatial data includes receiving a point cloud comprised of a plurality of points defined within three-dimensional (3D) space. A previously unclustered point is selected from the point cloud and a new cluster is created if the selected point was previously unclustered and is determined to be a core point based on a number of neighboring points located within a search radius. If determined to be a core point, neighboring points of the identified core point are added to a neighbor list. For each point on the neighbor list, a determination is made if the neighboring point is also a core point. For a neighboring point identified as a core point, the point is added to the cluster and neighbors of the neighboring point (i.e., core point) are added to the neighbor list for analysis. For a neighboring point not identified as a core point, the azimuth and/or elevation angle between the neighboring point and an adjacent point are compared to a threshold, wherein if the azimuth and/or elevation angle between the neighboring point and the adjacent point is less than a threshold the adjacent point is added to the neighbor list if not previously assigned to a cluster.

The method of the preceding paragraph can optionally include, additionally and/or alternatively any, one or more of the following features, configurations and/or additional components.

For example, if the azimuth and/or elevation angle between the neighboring point and the adjacent point is greater than a threshold then the neighboring point is identified as a border point and added to the cluster and no further action is taken with respect to the adjacent point.

In some embodiments, the method further includes determining whether the adjacent point has been visited, wherein the adjacent point is added to the neighbor list if the adjacent point has not been visited.

In some embodiments, if the adjacent point has been visited and the adjacent point was previously determined to be a noise point, then the adjacent point is identified as a border point and added to the cluster.

In some embodiments, if the adjacent point has been visited and the adjacent point was not previously determined to be a noise point, then the second point is not added to the current cluster.

According to another aspect, a system includes at least one processor and a clustering module configured to, when executed by the at least one processor, implement a density-based clustering algorithm that clusters a plurality of points received by the system into one or more clusters. The density-based clustering algorithm is configured to receive a point cloud comprised of a plurality of points defined within three-dimensional (3D) space and apply a search algorithm to the point cloud, wherein the search algorithm selects clustering parameters including one or more of minimum point threshold and search radius for each point in the point cloud. The density-based clustering algorithm is further configured to apply a clustering algorithm to the point cloud, wherein the clustering algorithm traverses at least some of the points in the point cloud and utilizes the minimum point threshold and search radius associated with each point by the search algorithm to selectively add points to clusters.

The method of the preceding paragraph can optionally include, additionally and/or alternatively any, one or more of the following features, configurations and/or additional components.

For example, applying the search algorithm may further include determining a distance to a point and selecting a minimum point threshold for the point based on the determined distance to the point.

In some embodiments, applying the search algorithm further includes identifying the point as a core point based on a comparison of a number of neighboring points located within the defined search radius of the point with the defined minimum point threshold and increasing the search radius if the point is not identified as a core point and retrieving additional neighboring points based on the increased search radius.

In some embodiments, applying the search algorithm further includes calculating a density associated with each of the points based on a number of neighbors located within the selected search radius associated with each point.

In some embodiments, applying the clustering algorithm further includes traversing at least some of the points in the point cloud based on calculated density associated with each point, wherein the points are traversed from dense to sparse.

In some embodiments, applying the clustering algorithm further includes selecting a previously unclustered point and creating a new cluster if the selected point is a core point and previously unclustered. Neighboring points are added to a neighbor list associated with the new cluster if the point is a core point, wherein neighboring points are located within a search radius of the core point. Each point on the neighbor list is reviewed and identified as either a core point or a border point, wherein a neighbor point identified as a core point is assigned to the new cluster and neighbors of the neighbor point identified as a core point are added to the neighbor list. In contrast, a neighbor point identified as a border point is assigned to the new cluster but neighbors of the border point are not added to the neighbor list.

The invention claimed is:

1. A LiDAR imaging system comprising:
   a light source to emit light into the surrounding environment;
   a detector to detect reflections of light emitted by the light source;
   at least one processor;
   a point cloud module configured to, when executed by the at least one processor, form a point cloud by aggregating a plurality of points generated by the light source and detector, wherein the point cloud provides spatial information about the surrounding environment; and
   a clustering module configured to, when executed by the at least one processor, implement an algorithm configured to:
      assign a search radius to each point in the point cloud in a searching phase based, at least in part, on distance of each point to the light source; and
      assign one or more of the points in the point cloud to one or more clusters in a clustering phase.

2. The LiDAR imaging system of claim 1, wherein the assigned search radius is utilized in combination with a minimum point threshold to classify each point as a core point, a border point, or a noise point, wherein core points and border points are assigned to clusters.

3. The LiDAR imaging system of claim 1, wherein the algorithm is further configured to define a density level of each point in the point cloud and sort the points based on the density level.

4. The LiDAR imaging system of claim 1, further comprising an object classification module configured to, when executed by the at least one processor,
   receive the one or more clusters;
   detect and/or classify one or more objects based on the one or more clusters; and
   output information about the one or more objects.

5. A method of imaging with a LiDAR imaging system, the method comprising:
   aggregating a plurality of points generated by a LiDAR light source into a point cloud, wherein each of the plurality of points provides spatial information about a field of view of the light source;
   applying a search algorithm to the point cloud, wherein the search algorithm selects clustering parameters including one or more of minimum point threshold and search radius for each point in the point cloud; and
   applying a clustering algorithm to the point cloud, wherein the clustering algorithm traverses at least some of the points in the point cloud and utilizes the minimum point threshold and search radius associated with each point by the search algorithm to selectively add points to clusters.

6. The method of claim 5, wherein a distance to the point is utilized to select the search radius and/or the minimum point threshold, wherein a greater distance correlates to: a greater search radius and a lower minimum point threshold.

7. The method of claim 5, wherein the search radius and the minimum point threshold are utilized to classify each of the points in the point cloud as a core point, a border point, or a noise point, and each core point and each border point is assigned to a single cluster of the clusters.

8. The method of claim 5, further comprising utilizing the cluster to detect and/or classify objects within the surrounding environment.

9. The method of claim 5, wherein the minimum point threshold is assigned a first value for points within a threshold close distance of the LiDAR light source, the minimum point threshold is assigned a second value for points exceeding a threshold far distance from the LiDAR light source, and an adjustable value between the first value and the second value for points between the threshold close distance and the threshold far distance.

10. The method of claim 5, wherein the search radius is assigned based, at least in part, on distance of the point to the LiDAR sensor and/or based on resolution of the LiDAR sensor.

11. A method of imaging with a LiDAR imaging system, the method comprising:
   aggregating a plurality of points generated by a LiDAR light source into a point cloud, wherein each of the plurality of points provides spatial information about a field of view of the light source;
   applying a search algorithm to the point cloud, wherein the search algorithm defines a density level of each of the plurality of points in the point cloud and sorts the plurality of points based on the density level; and
   applying a clustering algorithm to the point cloud, wherein the clustering algorithm traverses at least some of the points in the point cloud based on the defined density level and utilizes a minimum point threshold and a search radius to selectively add points to clusters.

12. The method of claim 11, wherein the clustering algorithm traverses the point cloud from high density points to low density points.

13. The method of claim 11, wherein the search algorithm utilizes a search radius to retrieve neighboring points and calculate a density of each point, wherein the search radius is increased one time if a selected point does not have enough neighboring points within the search radius.

14. The method of claim 13, wherein the search radius correlates to a distance to the point, the search radius increasing as the distance to the point increases.

15. The method of claim 13, wherein the search radius correlates to a resolution of the LiDAR light source, the search radius increasing as the resolution increases.

16. The method of claim 13, wherein an increase in the search radius is related to a number of points detected, wherein a greater number of detected neighboring points correlates to a smaller increase in the search radius.

17. The method of claim 11, wherein the search algorithm determines a distance to each point; and selects a minimum point threshold for the point based on the determined distance to the point.

18. The method of claim 17, wherein the minimum point threshold is set to a first constant value if the point is located within a first distance and to a second constant value if the point is located beyond a second distance.

19. The method of claim 17, wherein the minimum point threshold varies continuously based on the distance to the point.

20. The method of claim 11, wherein the minimum point threshold and the search radius utilized by the clustering algorithm are provided by the search algorithm.

* * * * *